(12) United States Patent
Wu

(10) Patent No.: US 12,217,544 B2
(45) Date of Patent: Feb. 4, 2025

(54) METHOD, APPARATUS AND DEVICE FOR RECOGNIZING THREE-DIMENSIONAL GESTURE BASED ON MARK POINTS

(71) Applicant: QINGDAO PICO TECHNOLOGY CO., LTD., Shandong (CN)

(72) Inventor: Tao Wu, Shandong (CN)

(73) Assignee: QINGDAO PICO TECHNOLOGY CO., LTD., Qingdao (CN)

( * ) Notice: Subject to any disclaimer, the term of this patent is extended or adjusted under 35 U.S.C. 154(b) by 377 days.

(21) Appl. No.: 17/763,575

(22) PCT Filed: Aug. 24, 2021

(86) PCT No.: PCT/CN2021/114363
§ 371 (c)(1),
(2) Date: Mar. 24, 2022

(87) PCT Pub. No.: WO2022/042566
PCT Pub. Date: Mar. 3, 2022

(65) Prior Publication Data
US 2022/0392264 A1   Dec. 8, 2022

(30) Foreign Application Priority Data
Aug. 24, 2020   (CN) .......................... 202010856958.6

(51) Int. Cl.
*G06V 20/60*   (2022.01)
*G06V 10/24*   (2022.01)
(Continued)

(52) U.S. Cl.
CPC ............ *G06V 40/28* (2022.01); *G06V 10/245* (2022.01); *G06V 20/653* (2022.01)

(58) Field of Classification Search
CPC ..................................................... G06V 40/28
See application file for complete search history.

(56) References Cited

U.S. PATENT DOCUMENTS

2015/0206032 A1   7/2015  Han et al.
2016/0210504 A1*  7/2016  Kim ...................... B60K 35/10
(Continued)

FOREIGN PATENT DOCUMENTS

CN   106562764 A   4/2017
CN   109359538 A   2/2019
(Continued)

OTHER PUBLICATIONS

Chai, G., et al., Research of 3D Position Detection and Stability Based on Multicolor Marks, Journal of WUT, vol. 33, No. 5, Oct. 2011, English Abstract only (5 pages).
(Continued)

*Primary Examiner* — Oneal R Mistry

(57) ABSTRACT

A method and apparatus for recognizing a three-dimensional gesture based on mark points, a device and a storage medium are provided. An image collected by each camera is acquired; for each image, an identifier and a corresponding two-dimensional coordinate position of each mark point in the image are determined; a three-dimensional coordinate position of each mark point in a coordinate system of a corresponding camera is determined according to the two-dimensional coordinate position of each mark point and a calibration parameter of the corresponding camera; the three-dimensional coordinate position is converted to an initial three-dimensional coordinate position in a coordinate system of the designated space; and a target three-dimensional coordinate position of each mark point in the coordinate system of the designated space is determined according to the initial three-dimensional coordinate position of each mark point in each image and the identifier of the corresponding mark point.

20 Claims, 4 Drawing Sheets

(51) Int. Cl.
  *G06V 20/64*  (2022.01)
  *G06V 40/20*  (2022.01)

(56) References Cited

U.S. PATENT DOCUMENTS

| | | | |
|---|---|---|---|
| 2019/0004609 A1* | 1/2019 | Swissa | G06V 40/28 |
| 2020/0368616 A1* | 11/2020 | Delamont | H04N 13/239 |
| 2020/0387698 A1 | 12/2020 | Yi et al. | |
| 2021/0004146 A1* | 1/2021 | Linville | G06F 3/0304 |
| 2021/0034846 A1* | 2/2021 | Ko | G06N 3/082 |

FOREIGN PATENT DOCUMENTS

| | | |
|---|---|---|
| CN | 110163048 A | 8/2019 |
| CN | 110443154 A | 11/2019 |
| CN | 111191632 A | 5/2020 |
| CN | 111208783 A | 5/2020 |
| CN | 111368668 A | 7/2020 |
| CN | 111433783 A | 7/2020 |
| CN | 111491066 A | 8/2020 |
| CN | 112115799 A | 12/2020 |
| WO | 2020010979 A1 | 1/2020 |
| WO | 2020140798 A1 | 7/2020 |

OTHER PUBLICATIONS

International Patent Application No. PCT/CN2021/114363, International Search Report mailed Nov. 10, 2021, 8 pages with English Translation.

* cited by examiner

METHOD, APPARATUS AND DEVICE FOR RECOGNIZING THREE-DIMENSIONAL GESTURE BASED ON MARK POINTS

CROSS-REFERENCE TO RELATED APPLICATION

The present disclosure is a national stage filing of PCT International Application No. PCT/CN2021/114363 filed on Aug. 24, 2021, which claims priority to Chinese Patent Application No. 202010856958.6, filed to the China National Intellectual Property Administration (CNIPA) on Aug. 24, 2020 and entitled "Method, Apparatus and Device for Recognizing Three-Dimensional Gesture based on Mark Points", the present disclosure of which is hereby incorporated by reference in its entirety.

TECHNICAL FIELD

The present disclosure relates to the technical field of image processing, and in particular to a method for recognizing a three-dimensional gesture based on mark points, an apparatus for recognizing a three-dimensional gesture based on mark points, a server, and a computer-readable storage medium.

BACKGROUND

In order to enhance the immersion of virtuality and reality combination of a head-mounted device (for example, a Virtual Reality (VR) device, an Augmented Reality (AR) device, and a Mixed Reality (MR) device) so that the head-mounted device brings better user experiences, it is very important to realize man-machine interaction. During man-machine interaction, recognition of three-dimensional gestures of a user of the head-mounted device has become one of the important technical means.

At present, a common method for recognizing a three-dimensional gesture of a user of a head-mounted device is that: the user wears gloves, where a group of tracking and positioning sensors (for example IMU 9-axis sensors, or 3-axis electromagnetic sensors) are disposed at positions, corresponding to hand joints, on the gloves; posture information of the corresponding joints is determined by each group of tracking and positioning sensors; and the three-dimensional gesture of the user is formed according to the posture information of each joint.

However, the method for recognizing the three-dimensional gesture of the user of the head-mounted device in the related art has the problems below.

Problem 1: Multiple tracking and positioning sensors are required to be arranged on the gloves worn by the user, and the multiple tracking and positioning sensors arranged on the gloves worn by the user are required to be calibrated before delivery, resulting in an increase of production cost of the gloves.

Problem 2: The multiple tracking and positioning sensors arranged on the gloves worn by the user emit a lot of heat during running, and the multiple tracking and positioning sensors arranged on the gloves cause reduction of flexibility, thereby reducing user experience.

SUMMARY

Embodiments of the present disclosure provide a technical solution for recognizing a three-dimensional gesture based on mark points.

According to the embodiments of a first aspect of the present disclosure, a method for recognizing a three-dimensional gesture based on mark points is provided, which is applied to a server in a gesture recognition system that may further include at least two cameras arranged in a designated space and at least one pair of gloves distributed with mark points corresponding to hand joints. The method includes the following operations.

An image collected by each of the cameras at a current time is acquired.

For each image, an identifier and a corresponding two-dimensional coordinate position of each mark point distributed on the glove or gloves in the image are determined.

A three-dimensional coordinate position of each mark point in a coordinate system of a corresponding camera is determined according to the two-dimensional coordinate position of each mark point and a calibration parameter of the corresponding camera.

The three-dimensional coordinate position of each mark point in the coordinate system of the corresponding camera is converted to an initial three-dimensional coordinate position in a coordinate system of the designated space.

A target three-dimensional coordinate position of each mark point distributed on the glove or gloves in the coordinate system of the designated space is determined according to the initial three-dimensional coordinate position of each mark point in each image and the identifier of the corresponding mark point.

In at least one exemplary embodiment, the operation that for each image, an identifier and a corresponding two-dimensional coordinate position of each mark point distributed on the glove or gloves in the image are determined may include the following operations.

For each image, a region of a glove image in the image is determined by using a glove detection model.

The identifier of each mark point distributed on the glove or gloves is recognized from the region by using a mark point recognition model, and the corresponding two-dimensional coordinate position is determined.

In at least one exemplary embodiment, the operation that for each image, an identifier and a corresponding two-dimensional coordinate position of each mark point distributed on the glove or gloves in the image are determined may include the following operations.

Each mark point contained in each image is recognized based on a key point recognition model.

The two-dimensional coordinate position of each mark point is determined according to a position of the corresponding mark point in the image.

A relative position between multiple mark points is determined based on the two-dimensional coordinate position of the mark point.

The identifier of each mark point is inferred according to the relative position between the mark points.

In at least one exemplary embodiment, the calibration parameter of the corresponding camera may include: an abscissa cx of an optical center on a photosensitive element of the camera, an ordinate cy of the optical center on the photosensitive element of the camera, and a vertical focal length $f_x$ and a horizontal focal length $f_y$ of the camera.

In at least one exemplary embodiment, the operation that a three-dimensional coordinate position of each mark point in a coordinate system of a corresponding camera is determined according to the two-dimensional coordinate position of each mark point and a calibration parameter of the corresponding camera may include the following operations.

The three-dimensional coordinate position of the mark point in the coordinate system of the corresponding camera is determined according to formula $P_c=(I(u)-cx)/f_x, I(v)-cy)/f_y, 1)$, where $P_c$ is the three-dimensional coordinate position of the mark point in the coordinate system of the corresponding camera; I(u) is an abscissa value in the two-dimensional coordinate position of the mark point; and I(v) is an ordinate value in the two-dimensional coordinate position of the mark point.

In at least one exemplary embodiment, the operation that the three-dimensional coordinate position of each mark point in the coordinate system of the corresponding camera is converted to an initial three-dimensional coordinate position in a coordinate system of the designated space may include the following operations.

A pose of the corresponding camera relative to an origin of the coordinate system of the designated space is acquired.

A depth of each mark point relative to the corresponding camera is acquired.

The three-dimensional coordinate position of each mark point in the coordinate system of the corresponding camera is converted to the initial three-dimensional coordinate position in the coordinate system of the designated space according to the pose and the depth of each mark point relative to the corresponding camera.

In at least one exemplary embodiment, the operation that a depth of each mark point relative to the corresponding camera is acquired may include the following operations.

For one mark point, two images that simultaneously contain the mark point and two corresponding cameras are determined.

The depth of the mark point relative to the corresponding camera is acquired based on a triangulation location method by using the pose between the two corresponding cameras and the two images.

In at least one exemplary embodiment, the operation that three-dimensional coordinate position of each mark point in the coordinate system of the corresponding camera is converted to the initial three-dimensional coordinate position in the coordinate system of the designated space according to the pose and the depth of each mark point relative to the corresponding camera may include the following operations.

Based on formula $\lambda * P_c = RP+T$, the three-dimensional coordinate position of each mark point in the coordinate system of the corresponding camera is converted to the initial three-dimensional coordinate position in the coordinate system of the designated space.

R is the amount of rotation of the camera corresponding to the mark point relative to the origin of the coordinate system of the designated space, T is an offset of the camera corresponding to the mark point relative to the origin of the coordinate system of the designated space, $\lambda$ is the depth of the mark point relative to the corresponding camera, and P is the initial three-dimensional coordinate position of the mark point.

In at least one exemplary embodiment, after the operation that for each image, an identifier and a corresponding two-dimensional coordinate position of each mark point distributed on the glove or gloves in the image are determined, the method may include the following operations.

For each mark point in each image, smooth filtering is performed on the two-dimensional coordinate position of the corresponding mark point according to the two-dimensional coordinate position of the corresponding mark point at a first preset historical time, so as to update the two-dimensional coordinate position of the corresponding mark point.

In at least one exemplary embodiment, the method may further include the following operations.

For each mark point distributed on the glove or gloves, smooth filtering is performed on the target three-dimensional coordinate position of the corresponding mark point according to the target three-dimensional coordinate position of the corresponding mark point at a second preset historical time, so as to update the target three-dimensional coordinate position of the corresponding mark point.

In at least one exemplary embodiment, the method may further include the following operations.

A first training sample set is acquired, the first training sample set including multiple first training samples, each first training sample including a first sample image containing a glove image of the glove or gloves and information of a region of the glove image in the first sample image.

By taking the first sample image as an input of a target region detection model and the information of the region of the corresponding glove image as a supervision, the target region detection model is trained to acquire the glove detection model.

A second training sample set is acquired, the second training sample set including multiple second training sample, each second training sample including a glove image of the glove or gloves serving as a second sample image, and identifiers of mark points contained in the second sample image.

By taking the second sample image as an input of a hand key point recognition model and the identifiers of the corresponding mark points as a supervision, the hand key point recognition model is trained to acquire the mark point recognition model.

In at least one exemplary embodiment, the operation that a first training sample set is acquired may include the following operations.

By the cameras, images of hands wearing the gloves in various postures are collected as the first sample images.

Regions where the gloves locate in the collected images are marked so as to determine the information of the region of the glove image of the gloves in each first sample image.

The first training sample set is acquired based on the first sample images and the information of the region of the glove image of the gloves in each first sample image.

In at least one exemplary embodiment, the operation that a second training sample set is acquired may include the following operations.

Images of hands wearing the gloves are collected, and glove images in the collected images are extracted as the second sample images.

Identifiers corresponding to mark points contained in the extracted glove images are marked so as to determine the identifiers of the mark points contained in each second sample image.

The second training sample set is acquired based on the glove images in the second sample images and the identifiers of the mark points contained in each second sample image.

In at least one exemplary embodiment, the mark points are passively luminous infrared mark points, and the cameras are infrared cameras provided with infrared light sources.

In at least one exemplary embodiment, after the operation that an image collected by each of the cameras at a current time is acquired, the method may further include the following operations.

An image that does not contain hands is removed from the collected image.

According to the embodiments of a second aspect of the present disclosure, an apparatus for recognizing a three-dimensional gesture based on mark points is provided, which may include an acquisition module, a first determination module, a second determination module, a conversion module, and a third determination module.

The acquisition module is configured to acquire an image collected by each of the cameras at a current time.

The first determination module is configured to determine, for each image, an identifier and a corresponding two-dimensional coordinate position of each mark point distributed on the glove or gloves in the image.

The second determination module is configured to determine, according to the two-dimensional coordinate position of each mark point and a calibration parameter of a corresponding camera, a three-dimensional coordinate position of each mark point in a coordinate system of the corresponding camera.

The conversion module is configured to convert the three-dimensional coordinate position of each mark point in the coordinate system of the corresponding camera to an initial three-dimensional coordinate position in a coordinate system of the designated space.

The third determination module is configured to determine a target three-dimensional coordinate position of each mark point distributed on the glove or gloves in the coordinate system of the designated space according to the initial three-dimensional coordinate position of each mark point in each image and the identifier of the corresponding mark point.

According to the embodiments of a third aspect of the present disclosure, a server is provided, which may include the apparatus as described in the embodiments of the second aspect, or may include a memory and a processor.

The memory is configured to store a computer instruction, and the processor is configured to call the computer instruction from the memory to implement the method as described in any one of the first aspect.

According to the embodiments of a fourth aspect of the present disclosure, a computer-readable storage medium having a computer program stored thereon is provided. When the computer program is executed by a processor, the method as described in any one of the first aspect is implemented.

In the embodiments of the present disclosure, the three-dimensional coordinate position of each mark point on each of the gloves worn on user's hands can be acquired, and thus three-dimensional gestures of user's hands can be described through the three-dimensional coordinate position of each mark point. That is, the method for recognizing a three-dimensional gesture based on mark points, provided in the embodiments of the present disclosure, can realize recognition of three-dimensional gestures. Moreover, in the embodiments of the present disclosure, on the one hand, there is no need to arrange tracking and positioning sensors on the gloves, and on the other hand, there is no need to perform operations such as calibration of the gloves, so that cost of the gloves can be reduced. In addition, the mark points on the gloves only emit a small amount of heat or even emit no heat, and are small in size, so that user experience can be improved.

Through the following detailed description of the exemplary embodiments of the present disclosure with reference to the accompanying drawings, other features and advantages of the present disclosure will be clear.

BRIEF DESCRIPTION OF THE DRAWINGS

The accompanying drawings, which are incorporated in and constitute a part of this specification, illustrate embodiments of the present disclosure and, together with the description, serve to explain the principles of the embodiments of the present disclosure.

DETAILED DESCRIPTION OF THE EMBODIMENTS

Figure 1:
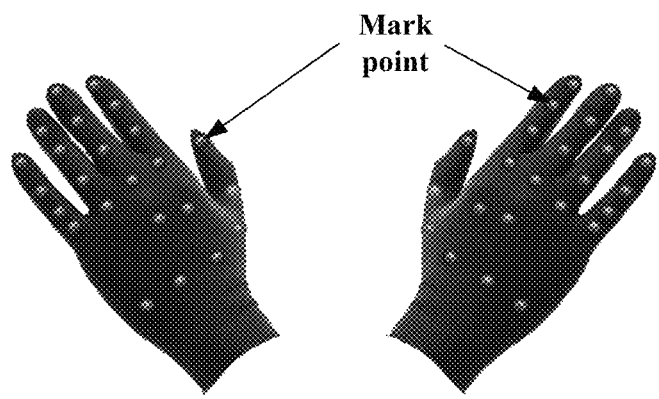
FIG. 1 is a schematic diagram of a pair of gloves according to some embodiments of the present disclosure.

Various exemplary embodiments of the present disclosure will be described below in detail with reference to the accompanying drawings. It is to be noted that, unless specifically described otherwise, relative arrangements, numerical expressions, and numerical values of components and operations set forth in these embodiments do not limit the scope of the present disclosure.

The description below to at least one exemplary embodiment is only illustrative, and should not be taken as any limitation to the present disclosure and the application or use scenario of the present disclosure.

The technologies, methods, and devices known to those having ordinary skill in the related art may not be discussed in detail, but where appropriate, the technologies, methods, and devices should be regarded as part of the specification.

In all the examples shown and discussed herein, any specific value should be interpreted as merely exemplary, rather than as a limitation. Therefore, other examples of the exemplary embodiments may have different values.

It is to be noted that similar reference numerals and letters indicate similar items in the drawings below, and thus, once an item is defined in one figure, further discussion thereon is omitted in the following figures.

<System>

The method for recognizing a three-dimensional gesture based on mark points according to some embodiments of the present disclosure is applied to a server 1000 in a gesture recognition system. The gesture recognition system may further include at least two cameras arranged in a designated space and at least one pair of gloves distributed with mark points corresponding to hand joints.

In the embodiments of the present disclosure, the designated space is a work space of the gesture recognition system. A union of image collection ranges of the at least two cameras disposed in the designated space usually covers the designated space. It is to be noted that the number and arrangement positions of the cameras in the designated space are not limited in the embodiments of the present disclosure, and it is only required that the union of the image collection ranges of all the cameras can cover the designated space.

It can be understood that due to the limited height of a user, the union of the image collection ranges of all cameras does not need to cover the entire designated space, and it is only required that the union of the image collection ranges can cover all possible ranges of activities of the user.

In an example, under the condition that the designated space is a closed room of 3 m*3 m*3 m (length*width*height), a certain number of cameras (for example, 9 cameras may be arranged on each wall in FIG. 2, for a total of 45 cameras) can be respectively arranged on the other 5 walls except the ground in the closed room. A Field of View (FOV) of each camera is set to 55°*45°, a frame rate of each camera is above 180 Hz, and a resolution of an image captured by each camera is 1080P.

In an embodiment, a server is in communication connection with each camera.

In another embodiment, in order to reduce a communication load of the server 1000, multiple switches may be arranged in the gesture recognition system. Each switch serves as a relay terminal to realize a communication connection between one group of cameras and the server 1000.

In the embodiments of the present disclosure, the user wears the glove or gloves which is/are provided with mark points. The mark point may be an actively luminous mark point, or a passively luminous mark point, or a rubber mark point in a special color.

Under the condition that the mark point is an actively luminous mark point, since the luminous point only needs to be provided with a light emitting device and a power supply and does not need to be provided with other extra processing circuits, the mark point emits low heat.

Under the condition that the mark point is a passively luminous point or a rubber mark point in a special color, since the luminous point is a mark point made of a special material that does not involve any circuit, the luminous point does not emit any heat.

In an example, the mark point may be a passively luminous infrared luminous point. Based on this, the cameras are infrared cameras provided with infrared light sources.

In an example, infrared light sources may be disposed around each infrared camera.

As shown in FIG. 1, after a user wears gloves, the mark points on the gloves and the hand joints of the user coincide. It can be understood that the gloves in the gesture recognition system may be gloves of different sizes to better fit hands of different sizes, so that the joint coincidence effect is better.

Figure 2:
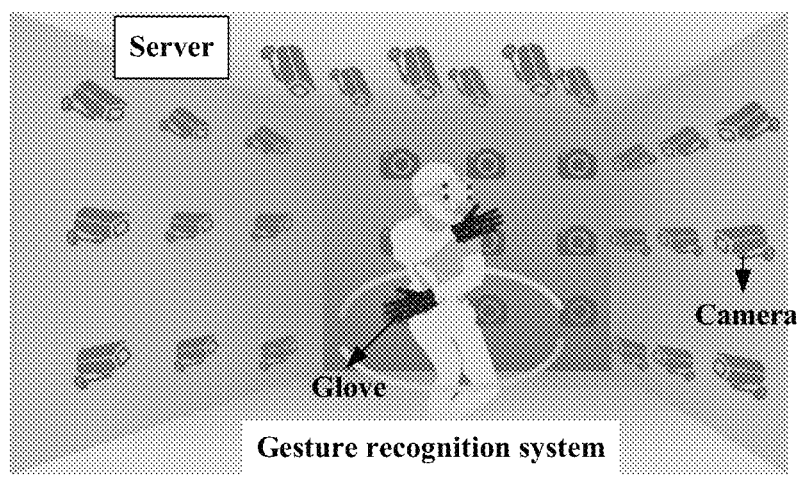
FIG. 2 is a schematic diagram of a gesture recognition system according to some embodiments of the present disclosure.

In combination with the above description of the gesture recognition system, in an example, the gesture recognition system may be as shown in FIG. 2.

Figure 3:
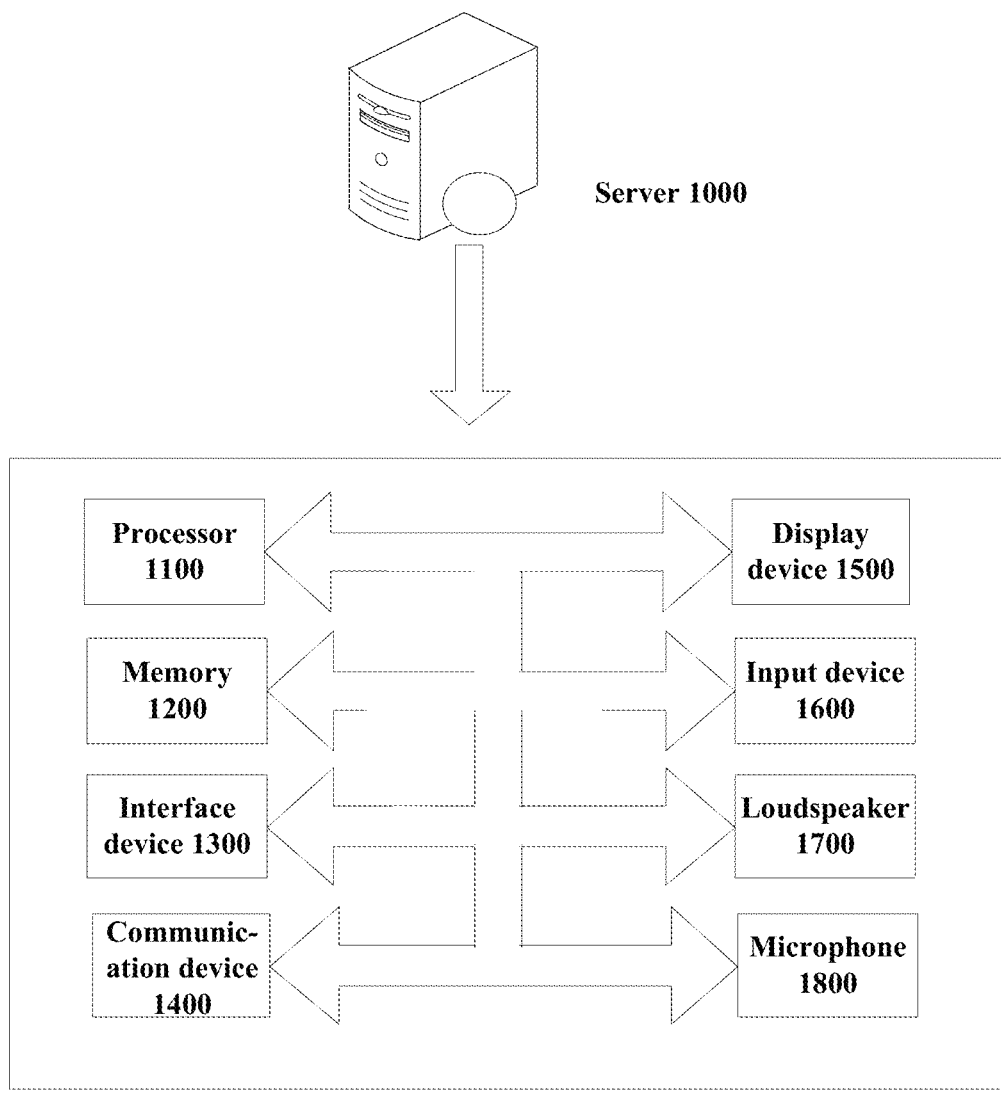
FIG. 3 is a block diagram of a hardware configuration of a server that implements the method for recognizing a three-dimensional gesture based on mark points according to some embodiments of the present disclosure.

In addition, as shown in FIG. 3, the abovementioned server 1000 may usually be a laptop computer, a desktop computer, a tablet computer, or the like.

The server 1000 may include a processor 1100, a memory 1200, an interface device 1300, a communication device 1400, a display device 1500, an input device 1600, a loudspeaker 1700, a microphone 1800, or the like. The processor 1100 may be a central processing unit (CPU), a microprocessor MCU, or the like. The memory 1200 includes, for example, a Read Only Memory (ROM), a Random Access Memory (RAM), a nonvolatile memory such as a hard disk, and the like. The interface device 1300 includes, for example, a USB interface, a headphone interface, and the like. The communication device 1400 can, for example, perform wired or wireless communication. The display device 1500 is, for example, a liquid crystal display, a touch display, and the like. The input device 1600 may include, for example, a touch screen, a keyboard, or the like.

The user can input/output voice information through the loudspeaker 1700 and the microphone 1800.

Although multiple devices are shown for the server 1000 in FIG. 2, the embodiments of the present disclosure may only involve some of the devices. For example, the server 1000 may only involve the memory 1200 and the processor 1100.

Applied to the embodiments of the present disclosure, the memory 1200 of the server 1000 is configured to store an instruction, and the instruction is used to control the processor 1100 to execute the method for recognizing a three-dimensional gesture based on mark points provided in the embodiments of the present disclosure.

In the above description, those having ordinary skill in the art can design the instruction according to the solution disclosed in the embodiments. How the instruction controls the processor to operate is well known in the art, which will not be described in detail here.

<Method>

The embodiments of the present disclosure provide a method for recognizing a three-dimensional gesture based on mark points, which is applied to a server 1000 in a gesture recognition system shown in FIG. 2 and FIG. 3. Based on FIG. 2, it can be understood that the gesture recognition system may further include at least two cameras arranged in a designated space and at least one glove distributed with mark points corresponding to hand joints.

Figure 4:
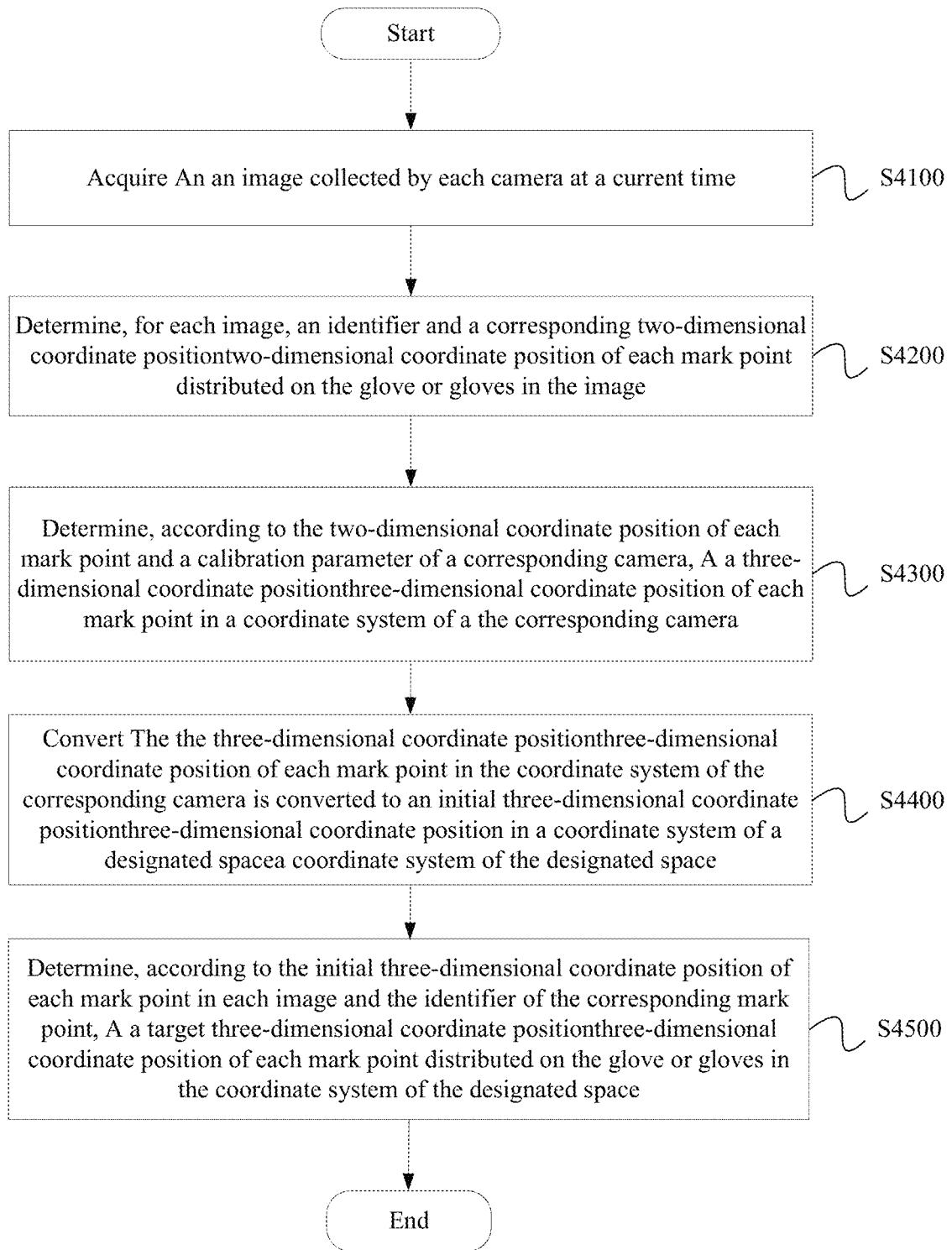
FIG. 4 is a schematic flowchart of a method for recognizing a three-dimensional gesture based on mark points according to some embodiments of the present disclosure.

As shown in FIG. 4, the method for recognizing a three-dimensional gesture based on mark points according to some embodiments of the present disclosure includes the following operations S4100 to S4500.

In S4100, an image collected by each of the cameras at a current time is acquired.

In the embodiments of the present disclosure, since a union of image collection ranges of all the cameras in the gesture recognition system at least can cover all possible ranges of activities of the user, the images acquired based on the above S4100 at least includes an image containing the user's hands.

In addition, for the images that contain the user's hands, since the user's hands wear the gloves distributed with mark points, the image containing the user's hands includes an image of the mark points corresponding to the hand joints.

It is to be noted that part of the cameras may not capture images containing the user's hands, and thus, after the above S4100, the method for recognizing a three-dimensional gesture based on mark points according to the embodiments of the present disclosure may further include that an image that does not contain the user's hands, among the images acquired in the above S4100, is removed.

In S4200, for each image, an identifier and a corresponding two-dimensional coordinate position of each mark point distributed on the glove or gloves in the image are determined.

In an embodiment, the above S4200 is implemented through S4210 and S4220 as below.

In S4210, for each image, a region of a glove image in the image is determined by using a glove detection model.

In the embodiments of the present disclosure, the glove detection model is a model for processing the images to acquire the region of the glove image in the image.

Based on the above content, the method for recognizing a three-dimensional gesture based on mark points according to the embodiments of the present disclosure may further include operations S4211 and S4212 as below.

In S4211, a first training sample set is acquired, the first training sample set including multiple first training samples, each first training sample including a first sample image containing a glove image of the glove or gloves and information of a region of the glove image in the first sample image.

In the embodiments of the present disclosure, images of hands wearing the gloves in various postures are collected first by the cameras as the first sample images. Then, regions where the gloves locate in the collected images are marked so as to determine the information of the region of the glove image of the gloves in each first sample image. Based on this, the first training sample set is acquired.

It is to be noted that the number of first training samples in the first training sample set is not limited.

In S4212, by taking the first sample image as an input of a target region detection model and the information of the region of the corresponding glove image as a supervision, the target region detection model is trained to acquire the glove detection model.

In an example, the target region detection model may be a conventional Mask Region-based Convolutional Neural Network (R-CNN) model.

In S4220, the identifier of each mark point distributed on the glove or gloves is recognized from the region by using a mark point recognition model, and the corresponding two-dimensional coordinate position is determined.

In the embodiments of the present disclosure, different mark point identifiers correspond to different hand joints. The same identifier of the mark point corresponds to the same hand joint. The mark point recognition model is a model for processing the glove image to acquire the identifier of each mark point contained in the glove image.

Based on the above content, the method for recognizing a three-dimensional gesture based on mark points according to the embodiments of the present disclosure may further include S4221 and S4222 as below.

In S4221, a second training sample set is acquired, the second training sample set including multiple second training sample, each second training sample including a glove image of the glove or gloves serving as a second sample image, and identifiers of mark points contained in the second sample image.

In an embodiment, images of hands wearing the gloves are collected first, glove images in the collected images are extracted as the second sample images. Then, identifiers corresponding to mark points contained in each extracted glove image are marked so as to determine the identifiers of the mark points contained in each second sample image. Based on this, the second training sample set is acquired.

It is to be noted that the number of second training samples in the second training sample set is not limited.

In S4222, by taking the second sample image as an input of a hand key point recognition model and the identifiers of the corresponding mark points as a supervision, the hand key point recognition model is trained to acquire the mark point recognition model.

In an embodiment of the present disclosure, the hand key point recognition model may be a hand key point detection model of OpenPose based on OpenCV DNN.

Based on this, after the identifier of the mark point is determined, the two-dimensional coordinate position of the corresponding mark point can be determined directly according to a position of the corresponding mark point in the image.

In another example, the above S4200 may also be implemented in other manner, for example, each mark point contained in the image is recognized based on a key point recognition model; the two-dimensional coordinate position of the mark point may be determined according to a position of the corresponding mark point in the image; a relative position between multiple mark points may be determined based on the two-dimensional coordinate position of the mark point; and an identifier of the mark point is inferred according to the relative position between the relative positions of the mark points.

In addition, it can be understood that since a lens of a camera usually has a distortion, after the two-dimensional coordinate position of each mark point is acquired based on the above S4200, the two-dimensional coordinate position of each mark point may be subjected to reverse distortion based on distortion parameter of the lens of the corresponding camera. The two-dimensional coordinate position subjected to reverse distortion is determined as the final accurate two-dimensional coordinate position of the mark point. The distortion parameter of the lens may be acquired by calibrating the camera.

In an embodiment, after the above S4200, the method for recognizing a three-dimensional gesture based on mark points according to the embodiments of the present disclosure may further include operation S4230 as below.

In S4230, for each mark point in each image, smooth filtering is performed on the two-dimensional coordinate position of the corresponding mark point according to the two-dimensional coordinate position of the corresponding mark point at a first preset historical time, so as to update the two-dimensional coordinate position of the corresponding mark point.

In an embodiment, the first preset historical time may be, e.g., an hour before a current time, or may be, e.g., an hour or two hours before the current time, or the like.

It is to be noted that a specific value of the first preset historical time is not limited in the embodiments of the present disclosure.

In the embodiments of the present disclosure, the smooth filtering is performed on the two-dimensional coordinate position of each mark point corresponding to the current time, so that accuracy and stability of the determined two-dimensional coordinate position of the mark point can be improved.

In S4300, a three-dimensional coordinate position of each mark point in a coordinate system of a corresponding camera is determined according to the two-dimensional coordinate position of each mark point and a calibration parameter of the corresponding camera.

In an embodiment, the calibration parameter of the camera may include: an abscissa cx of an optical center on a photosensitive element of the camera, an ordinate cy of the optical center on the photosensitive element of the camera, and a vertical focal length f and a horizontal focal length $f_y$ of the camera.

In the embodiments of the present disclosure, the above S4300 may be implemented through the following formula I:

$$P_c=(I(u)-cx)/f_x, I(v)-cy)/f_y, 1) \quad \text{(Formula I)}.$$

$P_c$ is the three-dimensional coordinate position of the mark point in the coordinate system of the corresponding camera.

I(u) is an abscissa value in the two-dimensional coordinate position of the mark point; and I(v) is an ordinate value in the two-dimensional coordinate position of the mark point.

In S4400, the three-dimensional coordinate position of each mark point in the coordinate system of the corresponding camera is converted to an initial three-dimensional coordinate position in a three-dimensional coordinate system of the designated space.

In an embodiment, the above S4400 may be implemented through operations S4410 to S4230 as below.

In S4410, a pose of the corresponding camera relative to an origin of the coordinate system of the designated space is acquired.

In the embodiments of the present disclosure, the designated space includes a three-dimensional coordinate system that is artificially determined in advance. In an example, a coordinate system of any one of cameras in the designated space may be taken as the coordinate system of the designated space.

In the embodiments of the present disclosure, a pose of each camera relative to the origin of the coordinate system of the designated space is artificially determined in advance. The pose includes the amount of translation and the amount of rotation.

In S4420, a depth of each mark point relative to the corresponding camera is acquired.

In the embodiments of the present disclosure, the exemplary implementation of the above S4420 may include: for one mark point, two images that simultaneously contain the mark point and two cameras corresponding to the two images are determined; and the depth of the mark point relative to the corresponding camera is acquired based on a triangulation location method by using the pose between the two corresponding cameras and the two images.

In S4430, the three-dimensional coordinate position of each mark point in the coordinate system of the corresponding camera is converted to the initial three-dimensional coordinate position in the coordinate system of the designated space according to the pose and the depth of each mark point relative to the corresponding camera.

In the embodiments of the present disclosure, the above S4430 may be achieved according to a multi-view perspective geometrical relationship. Based on this, the above S4430 may be implemented through the following formula II:

$$\lambda * P_c = R * P + T \quad \text{(formula II)}.$$

R is the amount of rotation of the camera corresponding to the mark point relative to the origin of the coordinate system of the designated space, and T is an offset of the camera corresponding to the mark point relative to the origin of the coordinate system of the designated space, $\lambda$ is the depth of the mark point relative to the corresponding camera, and P is the initial three-dimensional coordinate position of the mark point In S4500, a target three-dimensional coordinate position of each mark point distributed on the glove or gloves in the coordinate system of the designated space is determined according to the initial three-dimensional coordinate position of each mark point in each image and the identifier of the corresponding mark point.

In the embodiments of the present disclosure, the three-dimensional coordinate position of each mark point in the three-dimensional coordinate system in the designated space is acquired based on the above S4400. It can be understood that for different images, multiple three-dimensional coordinate positions, which are the same or different, of the mark points with the same identifier may be acquired. Based on this, the target three-dimensional coordinate position of the mark point corresponding to the identifier may be determined, based on the three-dimensional coordinate positions of all the mark points having the same identifier, according to the identifier of the mark point.

In an example, the manner for determining the target three-dimensional coordinate position of the mark point corresponding to the identifier, based on the three-dimensional coordinate positions of all the mark points having the same identifier, may include: nonlinear least squares optimization is performed on the three-dimensional coordinate positions of all the mark points having the same identifier, to acquire the target three-dimensional coordinate position of the mark point corresponding to the identifier.

In an embodiment, the method for recognizing a three-dimensional gesture based on mark points according to the embodiments of the present disclosure may further include operation S4600 as below.

In S4600, for each mark point distributed on the glove or gloves, smooth filtering is performed on the target three-dimensional coordinate position of the corresponding mark point according to the target three-dimensional coordinate position of the corresponding mark point at a second preset historical time, so as to update the target three-dimensional coordinate position of the corresponding mark point.

In an embodiment, the second preset historical time may be, e.g., an hour before a current time, or may be, e.g., an hour or two hours before the current time, or the like. It is to be noted that a specific value of the second preset historical time is not limited in the embodiments of the present disclosure.

In the embodiments of the present disclosure, the smooth filtering is performed on the target three-dimensional coordinate position of each mark point corresponding to the current time, so that the accuracy and stability of position recognition of three-dimensional gestures can be improved.

In the embodiments of the present disclosure, the three-dimensional coordinate position of each mark point on the gloves worn on user's hands can be acquired, and thus three-dimensional gestures of user's hands can be described through the three-dimensional coordinate position of each mark point. That is, the method for recognizing a three-dimensional gesture based on mark points, provided in the embodiments of the present disclosure, can realize recognition of three-dimensional gestures. Moreover, in the embodiments of the present disclosure, on the one hand, there is no need to arrange the tracking and positioning sensors on the gloves, and on the other hand, there is no need to perform operations such as calibration of the gloves, so that cost of the gloves can be reduced. In addition, the mark points on the gloves only emit a small amount of heat or even emit no heat, and are small in size, so that user experience can be improved.

<Apparatus>

Figure 5:
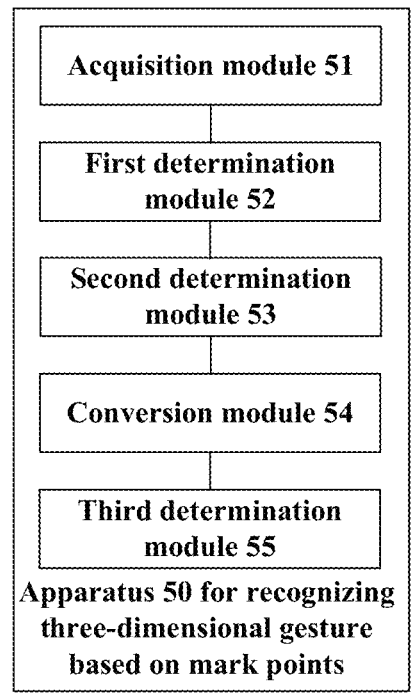
FIG. 5 is a structure diagram of an apparatus for recognizing a three-dimensional gesture based on mark points according to some embodiments of the present disclosure.
Figure 6:
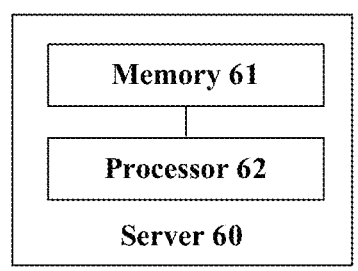
FIG. 6 is a structure diagram of a server according to some embodiments of the present disclosure.

The embodiments of the present disclosure provide an apparatus 50 for recognizing a three-dimensional gesture based on mark points. As shown in FIG. 5, the apparatus includes: an acquisition module 51, a first determination module 52, a second determination module 53, a conversion module 54, and a third determination module 55.

The acquisition module 51 is configured to acquire an image collected by each of the cameras at a current time.

The first determination module 52 is configured to determine, for each image, an identifier and a corresponding two-dimensional coordinate position of each mark point distributed on the glove or gloves in the image.

The second determination module 53 is configured to determine, according to the two-dimensional coordinate position of each mark point and a calibration parameter of a corresponding camera, a three-dimensional coordinate position of each mark point in a coordinate system of the corresponding camera.

The conversion module 54 is configured to convert the three-dimensional coordinate position of each mark point in the coordinate system of the corresponding camera to an initial three-dimensional coordinate position in a coordinate system of the designated space.

The third determination module 55 is configured to determine, according to the initial three-dimensional coordinate position of each mark point in each image and the identifier of the corresponding mark point, a target three-dimensional coordinate position of each mark point distributed on the glove or gloves in the coordinate system of the designated space.

In an embodiment, the first determination module 52 is configured to: determine, for each image, a region of a glove image in the image by using a glove detection model; and recognize the identifier of each mark point distributed on the glove or gloves from the region by using a mark point recognition model, and determine a corresponding two-dimensional coordinate position.

In an embodiment, the conversion module 54 is configured to: acquire a pose of the corresponding camera relative to an origin of the coordinate system of the designated space;
acquire a depth of each mark point relative to the corresponding camera; and
convert the three-dimensional coordinate position of each mark point in the coordinate system of the corresponding camera to the initial three-dimensional coordinate position in the coordinate system of the designated space according to the pose and the depth of each mark point relative to the corresponding camera.

In an embodiment, the apparatus 50 for recognizing a three-dimensional gesture based on mark points may further include a first smooth filtering module. The first smooth filtering module is configured to perform, for each mark point in each image, smooth filtering on the two-dimensional coordinate position of the corresponding mark point according to the two-dimensional coordinate position of the corresponding mark point at a first preset historical time, so as to update the two-dimensional coordinate position of the corresponding mark point.

In an embodiment, the apparatus 50 for recognizing a three-dimensional gesture based on mark points may further include a second smooth filtering module. The second smooth filtering module is configured to perform, for each mark point distributed on the glove or gloves, smooth filtering on the target three-dimensional coordinate position of the corresponding mark point according to the target three-dimensional coordinate position of the corresponding mark point at a second preset historical time, so as to update the target three-dimensional coordinate position of the corresponding mark point.

In an embodiment, the apparatus 50 for recognizing a three-dimensional gesture based on mark points may further include a training module. The training module is configured to: acquire a first training sample set, the first training sample set includes multiple first training samples, each first training sample including a first sample image containing a glove image of the glove or gloves and information of a region of the glove image in the first sample image;
by taking the first sample image as an input of a target region detection model and the information of the region of the corresponding glove image as a supervision, train the target region detection model to acquire the glove detection model;
acquire a second training sample set, the second training sample set including multiple second training sample, each second training sample including a glove image of the glove or gloves serving as a second sample image, and identifiers of mark points contained in the second sample image; and
by taking the second sample image as an input of a hand key point recognition model and the identifiers of the corresponding mark points as a supervision, train the hand key point recognition model to acquire the mark point recognition model.

In an embodiment, the mark points are passively luminous infrared mark points, and the cameras are infrared cameras provided with infrared light sources.

<Device>

The embodiments of the present disclosure also provide a server 60. The server 60 includes the apparatus 50 for recognizing a three-dimensional gesture based on mark points as shown in FIG. 5.

Or, the server includes a memory 61 and a processor 62. The memory 61 is configured to store a computer instruction. The processor 62 is configured to call the computer instruction from the memory 61 to perform any one of the method for recognizing a three-dimensional gesture based on mark points provided in the above method embodiments.

<Storage Medium>

The embodiments of the present disclosure also provide a computer-readable storage medium, in which a computer program instruction is stored, the computer program being executed by a processor to implement any one of the method for recognizing a three-dimensional gesture based on mark points provided in the above method embodiments.

The present disclosure may be implemented as a system, a method and/or a computer program product. The computer program product may include a computer-readable storage medium, in which a computer-readable program instruction configured to enable a processor to implement each aspect of the embodiments of the present disclosure is stored.

The computer-readable storage medium may be a physical device capable of retaining and storing an instruction used by an instruction execution device. For example, the computer-readable storage medium may be, but not limited to, an electric storage device, a magnetic storage device, an optical storage device, an electromagnetic storage device, a semiconductor storage device, or any appropriate combination thereof. More specific examples (non-exhaustive list) of the computer-readable storage medium include a portable computer disk, a hard disk, a RAM, a ROM, an EPROM (or a flash memory), an SRAM, a Compact Disc Read-Only Memory (CD-ROM), a Digital Video Disk (DVD), a memory stick, a floppy disk, a mechanical encoding device, a punched card or in-slot raised structure with an instruction stored therein, and any appropriate combination thereof. Herein, the computer-readable storage medium is not explained as a transient signal, for example, a radio wave or another freely propagated electromagnetic wave, an electromagnetic wave propagated through a wave guide or another transmission medium (for example, a light pulse propagated through an optical fiber cable) or an electric signal transmitted through an electric wire.

The computer-readable program instruction described here may be downloaded from the computer-readable storage medium to each computing/processing device or downloaded to an external computer or an external storage device through a network such as the Internet, a Local Area Network (LAN), a Wide Area Network (WAN) and/or a wireless network. The network may include a copper transmission cable, optical fiber transmission, wireless transmission, a router, a firewall, a switch, a gateway computer and/or an edge server. A network adapter card or network interface in each computing/processing device receives the computer-readable program instruction from the network and forwards the computer-readable program instruction for storage in the computer-readable storage medium in each computing/processing device.

The computer program instruction configured to execute the operations of the present disclosure may be an assembly instruction, an Instruction Set Architecture (ISA) instruction, a machine instruction, a machine related instruction, a microcode, a firmware instruction, state setting data or a source code or target code edited by one or any combination of more programming languages, the programming language including an object-oriented programming language such as Smalltalk and C++ and a conventional procedural programming language such as "C" language or a similar programming language. The computer-readable program instruction may be completely executed in a computer of a user or partially executed in the computer of the user, executed as an independent software package, executed partially in the computer of the user and partially in a remote computer, or executed completely in the remote server or a server. Under the condition that the remote computer is involved, the remote computer may be concatenated to the computer of the user through any type of network including an LAN or a WAN, or may be concatenated to an external computer (for example, concatenated by an Internet service provider through the Internet). In some embodiments, an electronic circuit such as a programmable logic circuit, an FPGA, or a Programmable Logic Array (PLA) may be customized by use of state information of a computer-readable program instruction, and the electronic circuit may execute the computer-readable program instruction, thereby implementing each aspect of the present disclosure.

Herein, each aspect of the present disclosure is described with reference to flowcharts and/or block diagrams of the method, device (system) and computer program product according to the embodiments of the present disclosure. It is to be understood that each block in the flowcharts and/or the block diagrams and a combination of each block in the flowcharts and/or the block diagrams may be implemented by computer-readable program instructions.

These computer-readable program instructions may be provided for a universal computer, a dedicated computer or a processor of another programmable data processing device, thereby generating a machine to further generate a device that realizes a function/action specified in one or more blocks in the flowcharts and/or the block diagrams when the instructions are executed through the computer or the processor of the other programmable data processing device. These computer-readable program instructions may also be stored in a computer-readable storage medium, and through these instructions, the computer, the programmable data processing device and/or another device may work in a specific manner, so that the computer-readable medium including the instructions includes a product including instructions for implementing each aspect of the function/action specified in one or more blocks in the flowcharts and/or the block diagrams.

These computer-readable program instructions may further be loaded to the computer, the other programmable data processing device or the other device, so that a series of operating operations are executed in the computer, the other programmable data processing device or the other device to generate a process implemented by the computer to further realize the function/action specified in one or more blocks in the flowcharts and/or the block diagrams by the instructions executed in the computer, the other programmable data processing device or the other device.

The flowcharts and block diagrams in the drawings illustrate probably implemented system architectures, functions and operations of the system, method, and computer program product according to multiple embodiments of the present disclosure. On this aspect, each block in the flowcharts or the block diagrams may represent part of a module, a program segment or an instruction, and part of the module, the program segment or the instruction includes one or more executable instructions configured to realize a specified logical function. In some alternative implementations, the functions marked in the blocks may also be realized in a sequence different from those marked in the drawings. For example, two continuous blocks may actually be executed substantially concurrently and may also be executed in a reverse sequence sometimes, which is determined by the involved functions. It is further to be noted that each block in the block diagrams and/or the flowcharts and a combination of the blocks in the block diagrams and/or the flowcharts may be implemented by a dedicated hardware-based system configured to execute a specified function or operation or may be implemented by a combination of a special hardware and a computer instruction. It is well known to those having ordinary skill in the art that implementation through hardware, implementation through software, and implementation through a combination of software and hardware are all equivalent.

Each embodiment of the present disclosure has been described above. The above descriptions are exemplary, non-exhaustive and also not limited to each disclosed embodiment. Many modifications and variations are apparent to those having ordinary skill in the art without departing from the scope of each described embodiment of the present disclosure. The terms used herein are selected to explain the principle and practical application of each embodiment or improvements in the technologies in the market best or enable others of ordinary skill in the art to understand each embodiment disclosed herein. It is intended that the scope of the present disclosure is limited by the appended claims.

What is claimed is:

1. A method for recognizing a three-dimensional gesture based on mark points, applied to a server in a gesture recognition system which further comprises at least two cameras arranged in a designated space and at least one pair of gloves distributed with mark points corresponding to hand joints, the method comprising:
　　acquiring an image collected by each of the cameras at a current time;
　　determining, for each image, an identifier and a corresponding two-dimensional coordinate position of each mark point distributed on the glove or gloves in the image;
　　determining, according to the two-dimensional coordinate position of each mark point and a calibration parameter of a corresponding camera, a three-dimensional coordinate position of each mark point in a coordinate system of the corresponding camera;
　　converting the three-dimensional coordinate position of each mark point in the coordinate system of the corresponding camera to an initial three-dimensional coordinate position in a coordinate system of the designated space; and
　　determining, according to the initial three-dimensional coordinate position of each mark point in each image and the identifier of the corresponding mark point, a target three-dimensional coordinate position of each mark point distributed on the glove or gloves in the coordinate system of the designated space.

2. The method according to claim 1, wherein determining, for each image, an identifier and a corresponding two-dimensional coordinate position of each mark point distributed on the glove or gloves in the image comprises:
   determining, for each image by using a glove detection model, a region of a glove image in the image; and
   recognizing, by using a mark point recognition model, the identifier of each mark point distributed on the glove or gloves from the region, and determining the corresponding two-dimensional coordinate position.

3. The method according to claim 1, wherein determining, for each image, an identifier and a corresponding two-dimensional coordinate position of each mark point distributed on the glove or gloves in the image comprises:
   recognizing, based on a key point recognition model, each mark point contained in each image;
   determining the two-dimensional coordinate position of each mark point according to a position of the corresponding mark point in the image;
   determining, based on the two-dimensional coordinate position of the mark point, a relative position between multiple mark points; and
   inferring the identifier of each mark point according to the relative position between the mark points.

4. The method according to claim 1, wherein the calibration parameter of the corresponding camera comprises: an abscissa cx of an optical center on a photosensitive element of the camera, an ordinate cy of the optical center on the photosensitive element of the camera, and a vertical focal length $f_x$ and a horizontal focal length $f_y$ of the camera.

5. The method according to claim 4, wherein determining, according to the two-dimensional coordinate position of each mark point and a calibration parameter of a corresponding camera, a three-dimensional coordinate position of each mark point in a coordinate system of the corresponding camera comprises:
   determining the three-dimensional coordinate position of the mark point in the coordinate system of the corresponding camera according to formula $P_c=(I(u)-cx)/f_x$, $I(v)-cy)/f_y,1)$ a wherein $P_c$ is the three-dimensional coordinate position of the mark point in the coordinate system of the corresponding camera; I(u) is an abscissa value in the two-dimensional coordinate position of the mark point; and I(v) is an ordinate value in the two-dimensional coordinate position of the mark point.

6. The method according to claim 1, wherein converting the three-dimensional coordinate position of each mark point in the coordinate system of the corresponding camera to an initial three-dimensional coordinate position in a coordinate system of the designated space comprises:
   acquiring a pose of the corresponding camera relative to an origin of the coordinate system of the designated space;
   acquiring a depth of each mark point relative to the corresponding camera; and
   converting, according to the pose and the depth of each mark point relative to the corresponding camera, the three-dimensional coordinate position of each mark point in the coordinate system of the corresponding camera to the initial three-dimensional coordinate position in the coordinate system of the designated space.

7. The method according to claim 6, wherein acquiring a depth of each mark point relative to the corresponding camera comprises:
   for one mark point, determining two images that simultaneously contain the mark point and two corresponding cameras; and
   acquiring the depth of the mark point relative to the corresponding camera based on a triangulation location method by using the pose between the two corresponding cameras and the two images.

8. The method according to claim 6, wherein converting, according to the pose and the depth of each mark point relative to the corresponding camera, the three-dimensional coordinate position of each mark point in the coordinate system of the corresponding camera to the initial three-dimensional coordinate position in the coordinate system of the designated space comprises:
   converting, based on formula $\lambda*P_c=R*P+T$, the three-dimensional coordinate position of each mark point in the coordinate system of the corresponding camera to the initial three-dimensional coordinate position in the coordinate system of the designated space;
   wherein R is the amount of rotation of the camera corresponding to the mark point relative to the origin of the coordinate system of the designated space, T is an offset of the camera corresponding to the mark point relative to the origin of the coordinate system of the designated space, $\lambda$ is the depth of the mark point relative to the corresponding camera, and P is the initial three-dimensional coordinate position of the mark point.

9. The method according to claim 1, wherein after determining, for each image, an identifier and a corresponding two-dimensional coordinate position of each mark point distributed on the glove or gloves in the image, the method further comprises:
   for each mark point in each image, performing smooth filtering on the two-dimensional coordinate position of the corresponding mark point according to the two-dimensional coordinate position of the corresponding mark point at a first preset historical time, so as to update the two-dimensional coordinate position of the corresponding mark point.

10. The method according to claim 1, further comprising:
    for each mark point distributed on the glove or gloves, performing smooth filtering on the target three-dimensional coordinate position of the corresponding mark point according to the target three-dimensional coordinate position of the corresponding mark point at a second preset historical time, to update the target three-dimensional coordinate position of the corresponding mark point.

11. The method according to claim 2, further comprising:
    acquiring a first training sample set, the first training sample set comprising multiple first training samples, each first training sample comprising a first sample image containing a glove image of the glove or gloves and information of a region of the glove image in the first sample image;
    training, by taking the first sample image as an input of a target region detection model and the information of the region of the corresponding glove image as a supervision, the target region detection model to acquire the glove detection model;
    acquiring a second training sample set, the second training sample set comprising multiple second training sample, each second training sample comprising a glove image of the glove or gloves serving as a second sample image, and identifiers of mark points contained in the second sample image; and training, by taking the second sample image as an input of a hand key point recognition model and the identifiers of the corresponding mark points as a supervision, the hand key point recognition model to acquire the mark point recognition model.

12. The method according to claim 11, wherein acquiring a first training sample set comprises:

collecting, by the cameras, images of hands wearing the gloves in various postures as the first sample images;

marking regions where the gloves locate in the collected images to determine the information of the region of the glove image of the gloves in each first sample image; and acquiring the first training sample set based on the first sample images and the information of the region of the glove image of the gloves in each first sample image.

13. The method according to claim 11, wherein acquiring a second training sample set comprises:

collecting images of hands wearing the gloves, and extracting glove images in the collected images as the second sample images;

marking identifiers corresponding to the mark points contained in the extracted glove images to determine the identifiers of the mark points contained in each second sample image; and acquiring the second training sample set based on the glove images in the second sample images and the identifiers of the mark points contained in each second sample image.

14. The method according to claim 1, wherein the mark points are passively luminous infrared mark points, and the cameras are infrared cameras provided with infrared light sources.

15. The method according to claim 1, wherein after acquiring the image collected by each of the cameras at a current time, the method further comprises:

removing an image that does not contain hands from the collected image.

16. An apparatus for recognizing a three-dimensional gesture based on mark points, comprising a memory storing instructions and a processor in communication with the memory, wherein the processor is configured to execute the instructions to:

acquire an image collected by each of the cameras at a current time;

determine, for each image, an identifier and a corresponding two-dimensional coordinate position of each mark point distributed on the glove or gloves in the image;

determine, according to the two-dimensional coordinate position of each mark point and a calibration parameter of a corresponding camera, a three-dimensional coordinate position of each mark point in a coordinate system of the corresponding camera;

convert the three-dimensional coordinate position of each mark point in the coordinate system of the corresponding camera to an initial three-dimensional coordinate position in a coordinate system of the designated space; and determine, according to the initial three-dimensional coordinate position of each mark point in each image and the identifier of the corresponding mark point, a target three-dimensional coordinate position of each mark point distributed on the glove or gloves in the coordinate system of the designated space.

17. A server, comprising the apparatus according to claim 16.

18. A non-transitory computer-readable storage medium, in which a computer program is stored, the computer program being executed by a processor to implement the method according to claim 1.

19. A server, comprising a memory and a processor, wherein the memory is configured to store a computer instruction, and the processor is configured to call the computer instruction from the memory in the memory to execute the method according to claim 1.

20. The method according to claim 1, wherein the target three-dimensional coordinate position of a mark point corresponding to an identifier is determined based on three-dimensional coordinate positions of all the mark points having the same identifier according to the identifier of the mark point.

* * * * *